United States Patent
Kipping

(10) Patent No.: US 6,631,737 B1
(45) Date of Patent: Oct. 14, 2003

(54) FLOW LIMITER

(76) Inventor: Cornelis Maria Kipping, Bergkampweg 6, NL-7231, CM Warnsveld (NL)

( * ) Notice: Subject to any disclaimer, the term of this patent is extended or adjusted under 35 U.S.C. 154(b) by 0 days.

(21) Appl. No.: 09/831,813

(22) PCT Filed: Nov. 12, 1999

(86) PCT No.: PCT/EP99/09032
§ 371 (c)(1),
(2), (4) Date: May 14, 2001

(87) PCT Pub. No.: WO00/31601
PCT Pub. Date: Jun. 2, 2000

(30) Foreign Application Priority Data

Nov. 19, 1998 (NL) .............................................. 1010592

(51) Int. Cl.⁷ .................................................. F15D 1/02
(52) U.S. Cl. .......................... 138/43; 138/46; 239/570; 239/571; 239/572; 239/573
(58) Field of Search .............................. 138/41, 42, 43, 138/46; 239/570, 571, 572, 573

(56) References Cited

U.S. PATENT DOCUMENTS

| | | | | |
|---|---|---|---|---|
| 904,246 A | * | 11/1908 | Buddington | 138/41 |
| 2,744,738 A | * | 5/1956 | Hjulian | 239/428.5 |
| 2,840,112 A | * | 6/1958 | Yarnall et al. | 138/43 |
| 2,899,981 A | * | 8/1959 | Binks | 138/46 |
| 3,131,716 A | * | 5/1964 | Griswold et al. | 138/46 |
| 3,267,918 A | * | 8/1966 | Ayres | 138/42 |
| 3,523,559 A | * | 8/1970 | Gibson | 138/43 |
| 3,635,405 A | * | 1/1972 | Shames et al. | 239/428.5 |
| 4,294,289 A | * | 10/1981 | Fischer | 138/44 |
| 4,760,957 A | * | 8/1988 | Rosenberg | 138/43 |
| 5,456,289 A | * | 10/1995 | Bergmann | 138/45 |

* cited by examiner

Primary Examiner—James Hook
(74) Attorney, Agent, or Firm—Diller, Ramik & Wight

(57) ABSTRACT

A device for controlling liquid flow in a conduit which is of a hat-like configuration defined by a cylindrical base part having a flange part at one end and a closure part at another end joined thereto by an integral spring which bends to permit through-flow of liquid through a peripheral gap between the body part and the closure part. The gap is of a stepwise progression including either an abrupt or curved step. The gap has a medial gap portion and opposite gap portion ends which are relatively sized to effect the stepwise progression.

36 Claims, 2 Drawing Sheets

FLOW LIMITER

BACKGROUND OF THE INVENTION

The invention relates to a device for arranging in a liquid conduit for limiting a liquid flow in this conduit.

Good-quality drinking-water can be obtained by treating water obtained by means of surface abstraction (rivers and lakes) and depth abstraction (groundwater). When the water has been purified to good-quality drinking-water, it must then be transported to the customer. This transport is very expensive because of the very finely branched supply system. Groundwater abstraction has the further drawback that the groundwater level falls through the abstraction of the water, and this can have adverse consequences for the environment.

Saving good-quality drinking-water is a good idea in order to prevent, among other things, a fall in the groundwater level and to reduce the consumption of energy for transport, purification and heating.

Water utility companies attempt to reduce the consumption of good-quality drinking-water in three ways. First of all, efforts are made to make the mains system as watertight as possible. Secondly, water-saving equipment is used and rainwater can for instance be used to do the washing, for the toilet and to water the garden. Thirdly, taps which are not used specifically for drawing a quantity of water, such as the tap of a wash-basin, are provided with a device as stated in the preamble. With such a device as according to the preamble the flow rate of such taps is limited to about 7–8 litres per minute.

NL-A-1001810 describes a flow limiter which comprises a hat-shaped part, wherein two slots are arranged in the upper side of the part. These slots bound a flexible bridge part which bends under the influence of the pressure difference over the hat-shaped part such that the slots are made smaller. This device has the drawback that due to the small dimensions of the gaps the operation of the device is adversely affected by small variations, for instance due to swelling of the material. This device has the further drawback that during limiting of warm or hot liquid flows the device deforms, whereby the operation is adversely affected. Because of the geometry of the bridge part it is moreover not possible to manufacture the device at a reasonable cost. In addition, it is extremely difficult to find a combination of material properties and shape and dimensions wherein the device functions over the whole operating range.

SUMMARY OF THE INVENTION

It is an object of the invention to prevent the above stated drawbacks.

It is a further object of the invention to provide a device which limits the flow such that the flow rate remains virtually the same irrespective of the pressure of the supply.

The above stated objectives are achieved with a device according to the invention, which device comprises a base part with a through-flow opening and a closing part which is arranged on the base part via spring means and which is displaceable with at least a substantial axial component for partially closing the through-flow opening against a closing surface on the base part, wherein the device can be fixed at a fixed position in the conduit by means of fixation means such that the liquid can pass through the device only via the through-flow opening and wherein the base part and the closing part are arranged relative to each other such that in a rest position defined by the spring means a gap is formed between the base part and the closing part, which gap is made smaller counter to the spring action by bending under the influence of the liquid pressure difference over the device.

An advantage of a device according to the invention is that the closing part closes off the through-flow opening as far as necessary and the size of he gap depends on the liquid pressure difference. The relation between the closing part and the liquid pressure difference results in practically the same outflow being obtained irrespective of the supply pressure of the liquid. In a preferred embodiment of the invention the base part comprises an annular flange part and a standing wall along the inner periphery of the annular flange part, and the closing part is arranged on the end of the wall remote from the annular flange part. This embodiment can be readily incorporated into a conduit and because the base part comprises an annular flange part the liquid can flow easily through the gap without the liquid encountering resistance from the base part.

In another embodiment of the invention the gap is wedge-shaped. This embodiment of the gap results in a very preferred limiting characteristic.

In yet another embodiment of the invention the gap comprises a constriction on both ends. A practically constant flow rate is hereby obtained over the whole operating range of the device.

In another preferred embodiment of the invention the flexible part comprises a plate part and at least one spring element connecting the plate part to the base part. The flow-limiting characteristic is hereby determined wholly by the spring element. The preferred limiting characteristic is obtained by a suitable choice of the spring characteristic of the spring element. The spring element is preferably helical.

In yet another embodiment the device is monolithic. The device is herein preferably manufactured by injection moulding, whereby the cost can be kept low.

In yet another embodiment of the device the closing surface comprises a protrusion for preventing complete closure of the gap. This prevents the device closing the conduit completely if the liquid pressure rises too high.

In another further embodiment the device comprises an opening for ensuring a minimal flow. This likewise prevents the gap from being completely closed by the closing part in the case of too high a liquid pressure.

In a preferred embodiment of the device the gap opening extends in radial direction. The advantage hereof is that a back-pressure is created under the closing part, whereby bending of the closing part progresses in smooth and damped manner as the pressure rises.

In yet another embodiment of the device the gap has a stepped wedge shape. The choking action of the device will hereby proceed in two stages. The first stage can thus be adapted to the requirements for a constant flow rate at a low pressure. The second stage can then be adapted to the requirements for a constant flow rate at high pressure.

These and other features of the invention will be further elucidated with reference to the annexed drawings.

DESCRIPTION OF THE PREFERRED EMBODIMENTS

Figure 1:
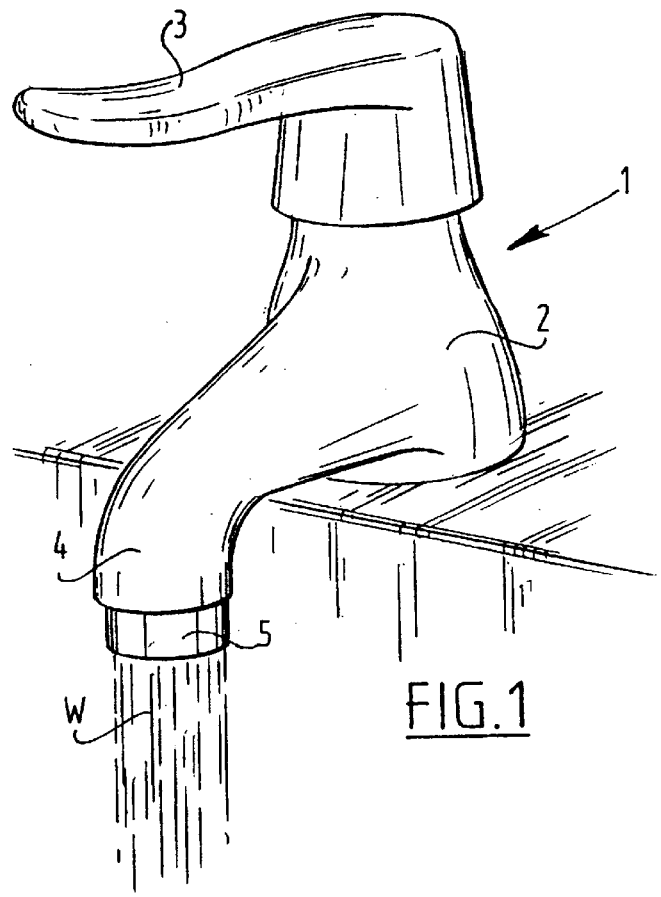
FIG. 1 shows a perspective view of a tap in which a device according to the invention is applied.

FIG. 1 shows a tap 1 comprising a housing 2 with an operating handle 3. On the underside of housing 2 is arranged an outlet opening 4, in which outlet opening 4 is arranged a screw-in part 5.

Figure 2:
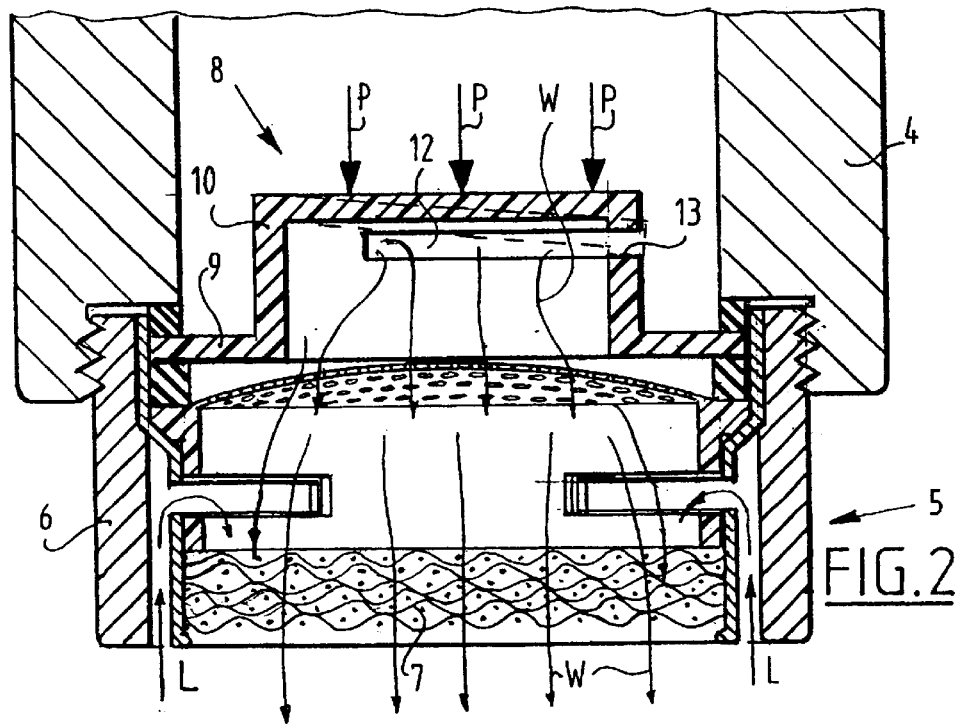
FIG. 2 shows a cross-section of the outlet opening of the tap shown in FIG. 1.

FIG. 2 shows a cross-section of outlet opening 4 and screw-in part 5. This latter consists of a bush 6 provided with screw thread and a filter device 7 as known from the prior art. A device 8 for limiting the liquid flow is further arranged on the filter device 7 in bush 6. This device 8 according to the invention comprises an annular flange part 9, a standing wall 10 along the inner periphery of the annular flange part and a flexible closing part 11 arranged on the standing wall. Closing part 11 and standing wall 10 are arranged relative to each other such that in the rest position the gap 12 is formed between the closing part and the standing wall. The part of standing wall 10 adjoining gap 12 forms the closing surface 13.

When operating handle 3 of tap 1 is operated a liquid, for instance water, will flow out through outlet opening 4 via screw-in part 5 (see FIG. 1). When there is a small pressure difference between the water pressure in outlet opening 4 and the outside pressure, the flexible closing part 11 will not bend and the water will flow through filter device 7 via gap 12. As the water W flows through filter device 7 air L is drawn in at the side of the device, thereby creating a "foamed" jet of water. When the pressure in tap 1 increases, the pressure difference over device 8 will increase and this pressure P will bend the flexible closing part 11. Gap 12 hereby becomes smaller, whereby the outflow of water W is limited. At a maximum pressure difference the flexible closing part 11 will come to lie against closing surface 13. Due to its form the gap 12 will not be completely closed, thereby ensuring a minimum water flow.

Figure 3:
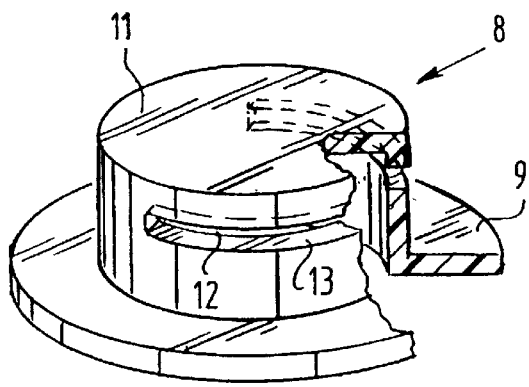
FIGS. 3–8 show embodiments of the device according to the invention.

FIG. 3 shows a perspective view of the device 8 according to the invention as applied in the tap 1 of FIGS. 1 and 2.

Figure 4:
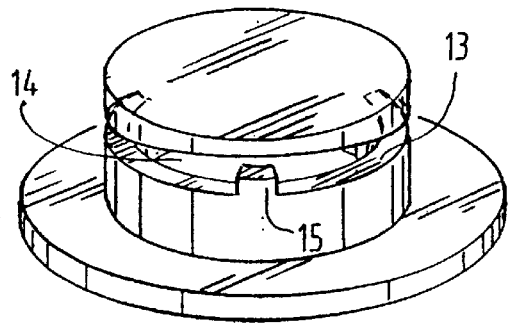

FIG. 4 shows a second embodiment of the invention. Here the gap 14 is wedge-shaped and, in order to prevent complete closure of the gap, a protrusion 15 is arranged on closing surface 13 which ensures a minimum flow of water.

Figure 5:
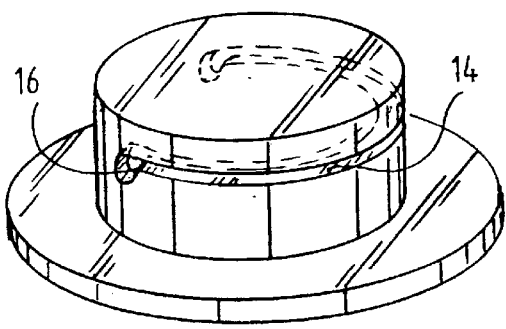

FIG. 5 shows a perspective view of a third embodiment of the invention. Here the gap 14 is likewise wedge-shaped but in order to ensures a minimum flow two holes 16 are arranged on the outer ends of gap 14. These holes are not closed by bending of closing part 11, whereby a minimum flow remains ensured.

Figure 6:
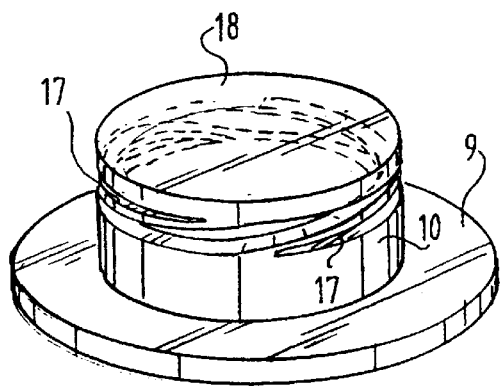

FIG. 6 shows a fourth embodiment of the invention, wherein device 8 comprises an annular flange part 9 and a standing wall 10. On standing wall 10 are arranged helical spring elements 17 which support a plate part 18. A uniform closure of the gap is obtained with these spring elements 17. A practically constant flow can hereby be obtained irrespective of the pressure difference over the device.

Figure 7:
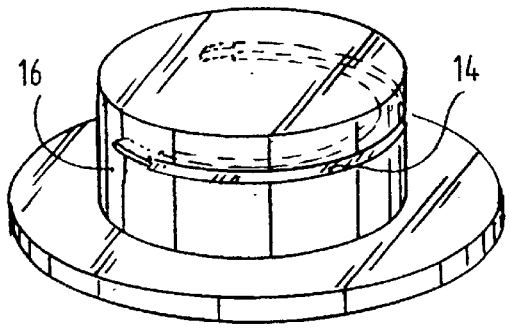

FIG. 7 shows a fifth embodiment of the invention. This embodiment largely corresponds with the embodiment of FIG. 3. Gap 14 however comprises constrictions 19 at both ends, whereby the start of the flow characteristic is influenced such that a constant flow is obtained even in the case of a small pressure difference over the device.

It is further possible to provide the flexible part of the device with ribs which influence the flow characteristic. The form of the gap also contributes towards this.

Figure 8:
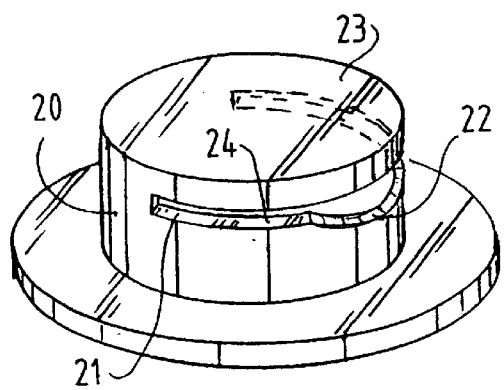

FIG. 8 shows a sixth embodiment of the invention. This embodiment also corresponds by and large with the embodiment of FIG. 3. The gap has a stepwise progression, however. A gap consisting of a first gap part 21 and a second gap part 22 is therefore arranged in cylindrical part 20. First gap part 21 is narrower than second gap part 22. When pressure is applied from above on closing part 23, it will then bend as the pressure increases. Closing part 23 will herein bend along the whole length of first gap part 21 and second gap part 22 during the first stage of pressure increase. When the pressure rises to a determined level, closing part 23 will contact edge 24, this at the location where first gap part 21 transposes into second gap part 22. If the pressure is now increased further, only the part of closing part 23 located above second gap part 22 will then bend. It is thus possible to cause the degree of closure of the gap to be adjusted in controlled manner. A constant flow rate is hereby obtained over a wide pressure range.

The maximum supply pressure may differ from place to place. In order to provide the best possible operation of a flow limiter, a flow limiter would have to be designed for each supply pressure. It is however also possible to place a sleeve round the standing wall of the device, whereby the supply of water towards the gap is limited. At a high supply pressure this pressure can thus be reduced, whereby a flow limiter suitable for lower pressures can still be used.

Although a preferred embodiment of the invention has been specifically illustrated and described herein, it is to be understood that minor variations may be made in the apparatus without departing from the spirit and scope of the invention, as defined the appended claims.

What is claimed is:

1. A device for limiting liquid flow in a conduit comprising a base part having a through-flow opening and a closing part carried by the base part through spring means for effecting displacement of the closure part with at least a substantial axial component for partially closing the through-flow opening against a closing surface on the base part, means for fixing the device at a fixed position in a conduit whereby liquid can pass through the device only via the through-flow opening, the base part and the closing part are arranged relative to each other such that in a rest position defined by the spring means a gap is formed between the base part and the closing part, said gap is made smaller counter to spring action of said spring means by bending under the influence of liquid pressure difference across the device; and the gap has a stepwise progression.

2. The device as defined in claim 1 wherein the gap has a stepped wedge shape.

3. The device as defined in claim 2 wherein the base part includes an annular flange part and a standing wall along an inner periphery of the annular flange part, and the closing part is arranged on an end of the standing wall remote from the annular flange part.

4. The device as defined in claim 2 wherein the closing part includes a plate part and said spring means includes at least one spring element connecting the plate part to the base part.

5. The device as defined in claim 2 wherein the device is monolithic.

6. The device as defined in claim 2 wherein a closing surface at least in part defining said gap includes a protrusion for preventing complete closure of the gap.

7. The device as defined in claim 2 wherein the device includes an opening for ensuring a minimal flow.

8. The device as defined in claim 2 wherein the gap includes a constriction on opposite ends thereof.

9. The device as defined in claim 2 wherein the gap extends in radial direction.

10. The device as defined in claim 1 wherein the base part includes an annular flange part and a standing wall along an inner periphery of the annular flange part, and the closing part is arranged on an end of the standing wall remote from the annular flange part.

11. The device as defined in claim 1 wherein the closing part includes a plate part and said spring means includes at least one spring element connecting the plate part to the base part.

12. The device as defined in claim 1 wherein the device is monolithic.

13. The device as defined in claim 1 wherein a closing surface at least in part defining said gap includes a protrusion for preventing complete closure of the gap.

14. The device as defined in claim 1 wherein the device includes an opening for ensuring a minimal flow.

15. The device as defined in claim 1 wherein the gap includes a constriction on opposite ends thereof.

16. The device as defined in claim 15 including a radially outwardly directed flange part axially remote from said closure part, and said base part being substantially cylindrical whereby said closure part, base part and flange part imparts a substantially hat-like configuration to said device.

17. The device as defined in claim 1 wherein the gap extends in radial direction.

18. The device as defined in claim 17 including a radially outwardly directed flange part axially remote from said closure part, and said base part being substantially cylindrical whereby said closure part, base part and flange part imparts a substantially hat-like configuration to said device.

19. The device as defined in claim 1 wherein said gap stepwise progression includes a substantially abrupt step.

20. The device as defined in claim 19 wherein said gap extends peripherally and includes opposite ends each ending at said spring means.

21. The device as defined in claim 19 wherein said medial opening portion includes a substantially curved step.

22. The device as defined in claim 21 wherein said gap extends peripherally and includes opposite ends each ending at said spring means.

23. The device as defined in claim 19 wherein said medial opening portion includes a substantially abrupt step.

24. The device as defined in claim 23 wherein said gap extends peripherally and includes opposite ends each ending at said spring means.

25. The device as defined in claim 1 wherein said gap stepwise progression includes a substantially curved step.

26. The device as defined in claim 25 wherein said gap extends peripherally and includes opposite ends each ending at said spring means.

27. The device as defined in claim 1 wherein said gap defines an opening having a medial opening portion and opposite end opening portions, and said stepwise progression is defined by said medial opening portion being of a relatively larger size as compared to the size of at least one of said opposite end opening portions.

28. The device as defined in claim 27 wherein said gap extends peripherally and includes opposite ends each ending at said spring means.

29. The device as defined in claim 1 wherein said gap defines an opening having a medial opening portion and opposite end opening portions, and said stepwise progression is defined by said medial opening portion being of a relatively larger size as compared to the size of said opposite end opening portions.

30. The device as defined in claim 29 wherein said gap extends peripherally and includes opposite ends each ending at said spring means.

31. The device as defined in claim 1 wherein said gap defines an opening having a medial opening portion and opposite end opening portions, and said stepwise progression is defined by said medial opening portion being of a relatively smaller size as compared to the size of at least one of said opposite end opening portions.

32. The device as defined in claim 31 wherein said gap extends peripherally and includes opposite ends each ending at said spring means.

33. The device as defined in claim 1 wherein said gap defines an opening having a medial opening portion and opposite end opening portions, and said stepwise progression is defined by said medial opening portion being of a relatively smaller size as compared to the size of said opposite end opening portions.

34. The device as defined in claim 33 wherein said gap extends peripherally and includes opposite ends each ending at said spring means.

35. The device as defined in claim 1 including a radially outwardly directed flange part axially remote from said closure part, and said base part being substantially cylindrical whereby said closure part, base part and flange part imparts a substantially hat-like configuration to said device.

36. The device as defined in claim 1 wherein said gap extends peripherally and includes opposite ends each ending at said spring means.

* * * * *